United States Patent
Wobben

(10) Patent No.: US 7,347,667 B2
(45) Date of Patent: Mar. 25, 2008

(54) WIND POWER INSTALLATION

(76) Inventor: Aloys Wobben, Argestrasse 19, D-26607 Aurich (DE)

( * ) Notice: Subject to any disclaimer, the term of this patent is extended or adjusted under 35 U.S.C. 154(b) by 120 days.

(21) Appl. No.: 11/065,645

(22) Filed: Feb. 24, 2005

(65) Prior Publication Data

US 2005/0175451 A1    Aug. 11, 2005

Related U.S. Application Data

(63) Continuation of application No. 10/470,754, filed as application No. PCT/EP02/00898 on Jan. 25, 2002, now abandoned.

(30) Foreign Application Priority Data

Feb. 10, 2001    (DE) ................................ 101 06 208

(51) Int. Cl.
*F03D 7/04*    (2006.01)
(52) U.S. Cl. .............................. 416/1; 416/31; 416/32; 416/37; 416/85
(58) Field of Classification Search .................... 416/1, 416/31, 32, 37, 41, 61, 85, 102, 169 R; 290/44, 290/55

See application file for complete search history.

(56) References Cited

U.S. PATENT DOCUMENTS

| | | | |
|---|---|---|---|
| 4,084,921 A | 4/1978 | Norz | |
| 4,193,005 A | 3/1980 | Kos et al. | |
| 4,201,514 A | 5/1980 | Huetter | |
| 4,297,076 A | 10/1981 | Donham et al. | |
| 4,298,313 A | 11/1981 | Hohenemser | |
| 4,420,692 A | 12/1983 | Kos et al. | |
| 4,426,192 A | 1/1984 | Chertok et al. | |
| 4,966,525 A | * 10/1990 | Nielsen | ........................ 416/1 |
| 5,035,575 A | * 7/1991 | Nielsen et al. | .......... 416/169 R |
| 5,289,041 A | 2/1994 | Holley | |
| 6,320,272 B1 | 11/2001 | Lading et al. | |

(Continued)

FOREIGN PATENT DOCUMENTS

CA    2350745    11/2003

(Continued)

OTHER PUBLICATIONS

"Reduction of Fatigue Loads on Wind Energy Converters by Advanced Control Methods", Kleinkauf et al., European Wind Energy Conference, Oct. 1997, Dublin Castle, Ireland, pp. 555-558.

*Primary Examiner*—Christopher Verdier
(74) *Attorney, Agent, or Firm*—Neil A. Steinberg

(57) ABSTRACT

This relates to a wind power installation comprising a pylon (tower) and a rotor arranged on the pylon and having at least one individually adjustable rotor blade. The wind power installation further comprises a device to detect the wind direction, a device to detect the azimuthal position and/or a device to detect the deviation from vertical of the pylon (tower). In one embodiment, a control unit is coupled to the rotor blade to adjust an angle of incidence of the at least one adjustable rotor blade using information which is representative of (i) the wind direction, (ii) the azimuthal position of the rotor, and (iii) the deviation from vertical of the pylon. The rotor blade may be adjusted in dependence on a deviation between the ascertained wind direction and the detected azimuthal position.

22 Claims, 5 Drawing Sheets

U.S. PATENT DOCUMENTS

| | | | |
|---|---|---|---|
| 6,619,918 B1 * | 9/2003 | Rebsdorf | 416/1 |
| 6,876,099 B2 * | 4/2005 | Wobben | 290/44 |
| 6,927,502 B2 * | 8/2005 | Wobben | 290/44 |
| 6,945,752 B1 * | 9/2005 | Wobben | 290/44 |
| 6,979,171 B2 * | 12/2005 | Lauritsen | 416/85 |
| 7,052,232 B2 * | 5/2006 | Wobben | 416/61 |

FOREIGN PATENT DOCUMENTS

| | | |
|---|---|---|
| DE | 196 29 168 | 10/1997 |
| DE | 197 17 059 C1 | 7/1998 |
| DE | 197 39 162 A1 | 3/1999 |
| DE | 197 39 164 | 3/1999 |
| DE | 198 11 952 A1 | 9/1999 |
| DE | 198 46 796 A1 | 4/2000 |
| DE | 199 20 504 A1 | 6/2000 |
| EP | 0 149 467 A1 | 7/1985 |
| EP | 0 995 904 A2 | 4/2000 |
| FR | 2507146 | 12/1982 |
| WO | WO 99/36695 | 7/1999 |
| WO | WO-00/31413 A1 * | 6/2000 |
| WO | WO-01/33075 A1 * | 5/2001 |
| WO | WO-01/73292 A1 * | 10/2001 |
| WO | WO-01/86141 A1 * | 11/2001 |
| WO | WO-02-02936 A1 * | 1/2002 |
| WO | WO2004/097217 | 11/2004 |

\* cited by examiner

US 7,347,667 B2

WIND POWER INSTALLATION

RELATED APPLICATIONS

This application is a continuation application of application Ser. No. 10/470,754 (now abandoned), filed Nov. 12, 2003, which is the National Stage of International Application No. PCT/EP02/00898, filed Jan. 25, 2002, both of which claim priority to German Patent Application No. DE 101 06 208.7, filed on Feb. 10, 2001, the contents of which are incorporated herein by reference.

BACKGROUND OF THE INVENTION

The present invention concerns a wind power installation comprising a pylon and a rotor arranged on the pylon and having at least one individually adjustable rotor blade, comprising a device for detecting the wind direction and a device for detecting the azimuthal position.

Such wind power installations generally have an active drive for tracking the wind direction. The drive rotates the machine housing of the wind power installation in such a way that the rotor blades of the rotor are oriented in the direction of the wind if the installation is in the form of a windward-type rotor member. That drive which is required for wind direction tracking is usually an azimuthal drive which is usually disposed with the associated azimuthal bearings between the top of the pylon and the machine housing.

In the procedure involving the machine housing tracking the wind direction, an operational wind measuring system supplies a mean value in respect of the wind direction over a certain period of time, for example ten seconds. That mean value is always compared to the instantaneous azimuthal position of the machine housing. As soon as a deviation exceeds a given value, the machine housing is correspondingly adjusted to track the change in wind direction so that the deviation of the rotor in respect of the wind direction, being the yaw angle, is as slight as possible in order to avoid power losses.

The way in which a wind direction tracking procedure is implemented in known wind power installations is described in "Winkraftanlagen", Erich Hau, 2nd edition, 1996, pages 268 ff. and 316 ff., respectively.

In addition such a wind direction tracking procedure is known from laid-open application DE 199 20 504.

A disadvantage with those known arrangements however is that the azimuthal drives which are frequently in the form of electric motors have to be actuated for each wind direction tracking operation. Frequent actuation results in a high loading and correspondingly relatively rapid ageing and a high level of wear in such drives.

Furthermore a disadvantage with known structures of that kind is that increasing sizes of installation logically require more or larger drives in order to be able to implement the required adjusting movement. However, particularly in the case of a fault or if replacement is necessary, those larger drives require a considerably higher level of expenditure as they can only be moved out of or into the machine housing by means of a crane. If a hub height of 130 m and more is further factored into the considerations, installations which are set up on land already involve a considerable level of expenditure; however that rises far beyond all acceptable limits if the installation is an offshore installation. It will be appreciated that the amount of space required for such drives also increases.

SUMMARY OF THE INVENTION

The present invention is directed to a wind power installation including a pylon and a rotor arranged on the pylon and having at least one individually adjustable rotor blade, comprising a device for detecting the wind direction and a device for detecting the azimuthal position wherein the service life of the azimuthal drives is prolonged and/or it is possible to use smaller azimuthal drives which can thus be better handled.

In one embodiment, the service life of the azimuthal drives is prolonged and/or use of smaller azimuthal drives is possible by a control of rotor blade adjustment in dependence on a deviation between wind direction and azimuthal position. That control, according to one aspect of the invention, means that a considerable proportion of the wind direction tracking operation can be effected without switching on an azimuthal drive as the forces required for the wind direction tracking procedure can be produced by suitable adjustment of the angle of incidence of the rotor blades.

The invention affords the possibility, besides the hitherto usual azimuth adjustment by means of a motor drive, together with the motor drive or as an alternative thereto, to implement azimuthal positioning by control of the rotor blade adjustment in dependence on a deviation between the wind direction and the azimuthal position. Under some circumstances that is particularly advantageous when only slight azimuthal changes have to be effected. That means that the motor azimuthal drive generally is conserved.

If, for example, the motor azimuthal drive comprises two or more asynchronous motors, those motors, for azimuthal adjustment, can be supplied with corresponding three-phase current, but retardation of the machine housing is effected by means of a direct current supply to the asynchronous motors and the asynchronous motors are also supplied with direct current during the stoppage condition so that a mechanical brake is not absolutely necessary. If now displacement of the machine housing, that is to say azimuthal adjustment, is to be effected by means of the control of the rotor blade adjustment, motor braking must be terminated, which preferably effected by the direct current being extremely low or zero.

In a preferred embodiment of the invention, when the carrier of a wind power installation according to the invention is a platform on a floating platform or a platform floating in the water, the deviation between wind direction and azimuthal position is ascertained from detection of the deflection of the platform out of the horizontal or deflection of the pylon of the wind power installation out of the vertical. In that fashion it is easily possible to detect an inclination which necessarily arises out of a difference between wind direction and azimuthal position.

In a particularly preferred embodiment of the invention, the wind power installation according to the invention has an azimuthal bearing in the form of a plain bearing which, by virtue of predetermined sliding properties, on the one hand prevents knocking or flapping of the pylon head in the event of rapid changes in wind direction but, on the other hand, with sufficiently high forces, permits wind direction tracking without a motor drive.

Furthermore the invention provides a method of controlling the angle of incidence of a rotor blade of a wind power installation. That method ascertains a change in wind direction from a difference between wind direction and azimuthal position and/or a deflection of the platform out of the horizontal and/or a deflection of the pylon out of the vertical and the magnitude of the change in wind direction and the duration thereof are compared to predeterminable threshold values. It is possible in that way to recognise whether there is a need for wind direction tracking to be implemented.

Further advantageous embodiments are set forth in the appendant claims.

BRIEF DESCRIPTION OF THE DRAWINGS

An embodiment of the present invention is described in greater detail hereinafter with reference to the Figures in which.

DETAILED DESCRIPTION

Figure 1:
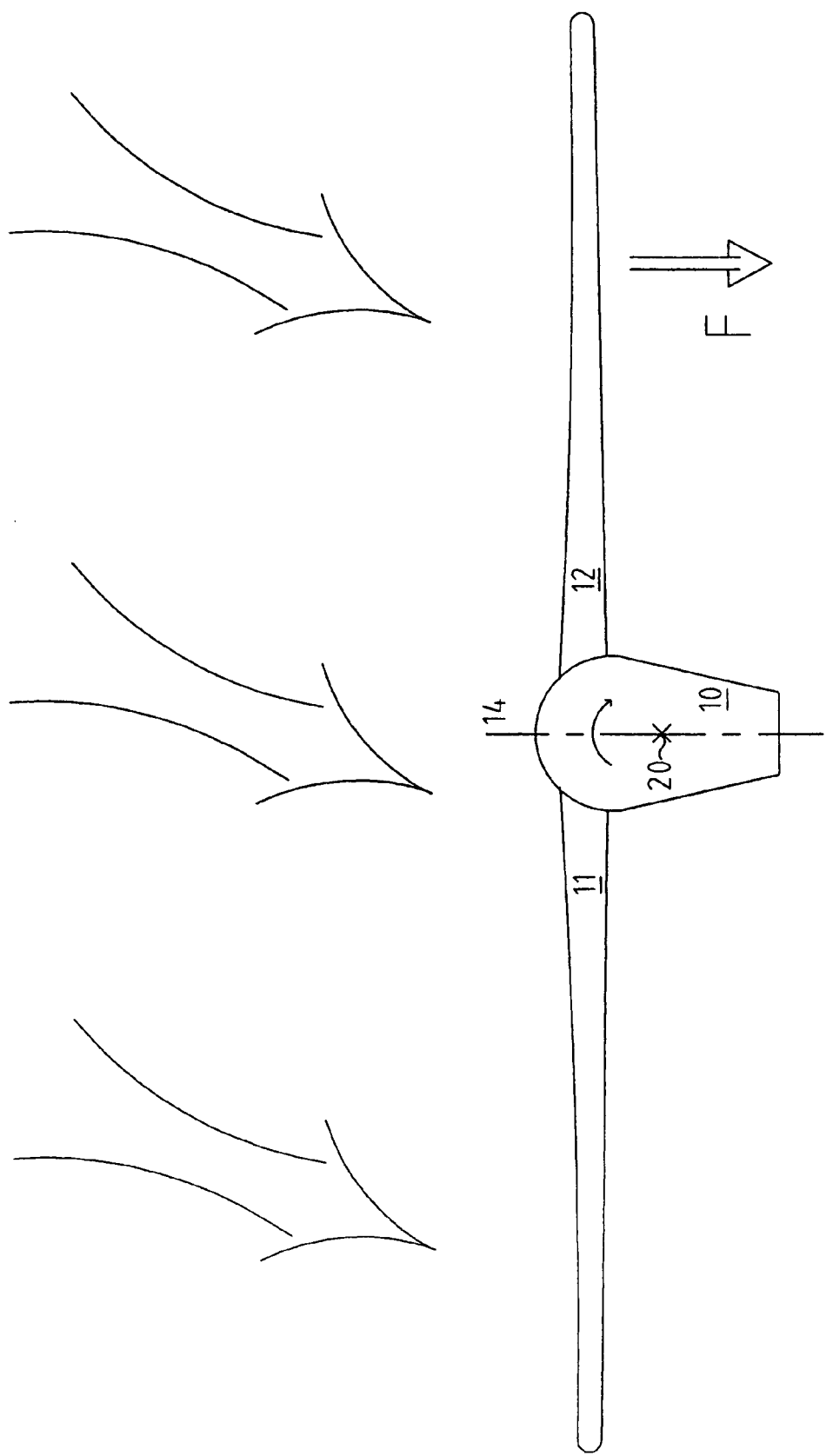
FIG. 1 is a plan view of a machine housing of a wind power installation.

FIG. 1 is a plan view on to a wind power installation with the machine housing 10 and rotor blades 11, 12. The centre of rotation of the machine housing 10 is marked by a point 20 while the main axis of the horizontal-axis rotor is indicated by a central line 14.

Now, as soon as there is a deviation between the main axis 14 of the rotor and the wind direction (which is indicated in FIG. 1 by inclinedly extending arrows) a check is made to ascertain whether a predeterminable threshold value in respect of the magnitude of the change in wind direction and the duration thereof is reached or exceeded. If that is the case, the angle of incidence of the rotor blade 11 shown at the left in FIG. 1 is altered in such a way that the air resistance is reduced. That results in an imbalance of forces between the two rotor blades 11, 12 and the air resistance, which is now higher, at the right rotor blade 12, gives rise to a force F which acts on the machine housing 10 with a torque in the direction of the arrow illustrated above the centre of rotation 20. In that way the rotor is adjusted to track to the wind without the azimuthal drive having to be switched on.

If the difference between the main axis 14 of the rotor and the wind direction exceeds a predeterminable threshold value, an existing azimuthal drive can be switched on to assist with the rotary movement and to reduce the asymmetric loading. That azimuthal drive is also required if the wind has completely died away and, after a period when there is no wind, blows from a different direction which excludes tracking adjustment of the rotor by the adjustment of the angle of incidence in the above-described manner.

It will be appreciated that, in an alternative embodiment of the invention, it is possible, in the situation shown in FIG. 1, to increase the air resistance of the right rotor blade 12, instead of reducing the air resistance of the left rotor blade 11. It will be noted that this increase in the air resistance of the right rotor blade 12 would result in a higher level of loading on that rotor blade 12 and would thus detrimentally affect the service life thereof. For that reason a reduction in the air resistance of the left rotor blade 11 and therewith a reduction in the loading on that rotor blade 11 is to be preferred.

Figure 2:
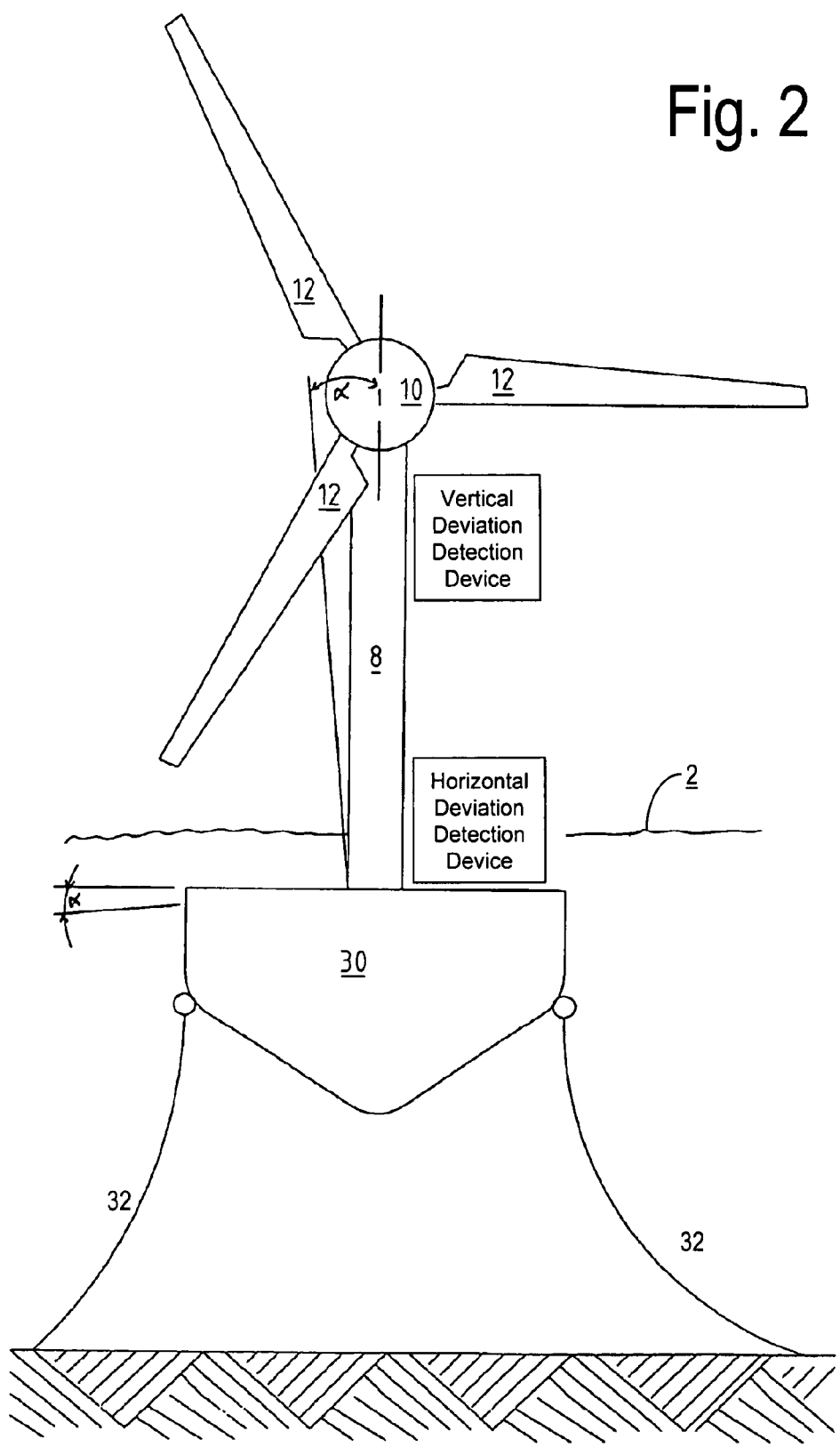
FIG. 2 shows a wind power installation on a platform floating in water.

FIG. 2 shows a wind power installation on a platform 30 which is floating in the water and which is held in its predetermined position for example by at least two anchor chains 32.

In this case the platform 30 is below the surface 2 of the water while the pylon 8 of the wind power installation sticks up out of the water and carries the machine housing 10 with the rotor blades 12.

As long as the wind is impinging on the wind power installation in precisely frontal relationship, a nodding moment will occur which deflects the wind power installation rearwardly in the perspective shown in FIG. 2. It will be noted that as soon as the wind direction is inclined, a lateral component is also added to the frontal component. That lateral component will cause a laterally directed deflection, in addition to the rearwardly directed deflation. That is manifested on the one hand in an inclination of the surface of the platform 30 out of the horizontal or by an inclination of the pylon 8 of the wind power installation out of the vertical by a predetermined amount which is indicated in FIG. 2 by the angle α on the one hand at the pylon 8 of the wind power installation and one the other hand at the surface of the platform 30.

While the deflection at the surface of the platform is still relatively slight, the deflection out of the perpendicular at the top of the pylon 8 can already be of a clearly detectable magnitude so that detection at the top of the pylon 8 can provide for the embodiment of a very sensitive device for detecting a change in wind direction and a deflection arising therefrom.

It will be appreciated that, in terms of detecting the deflection, it is to be noted that only a deflection due to the lateral wind component is relevant for the control action according to the invention.

Figure 3:
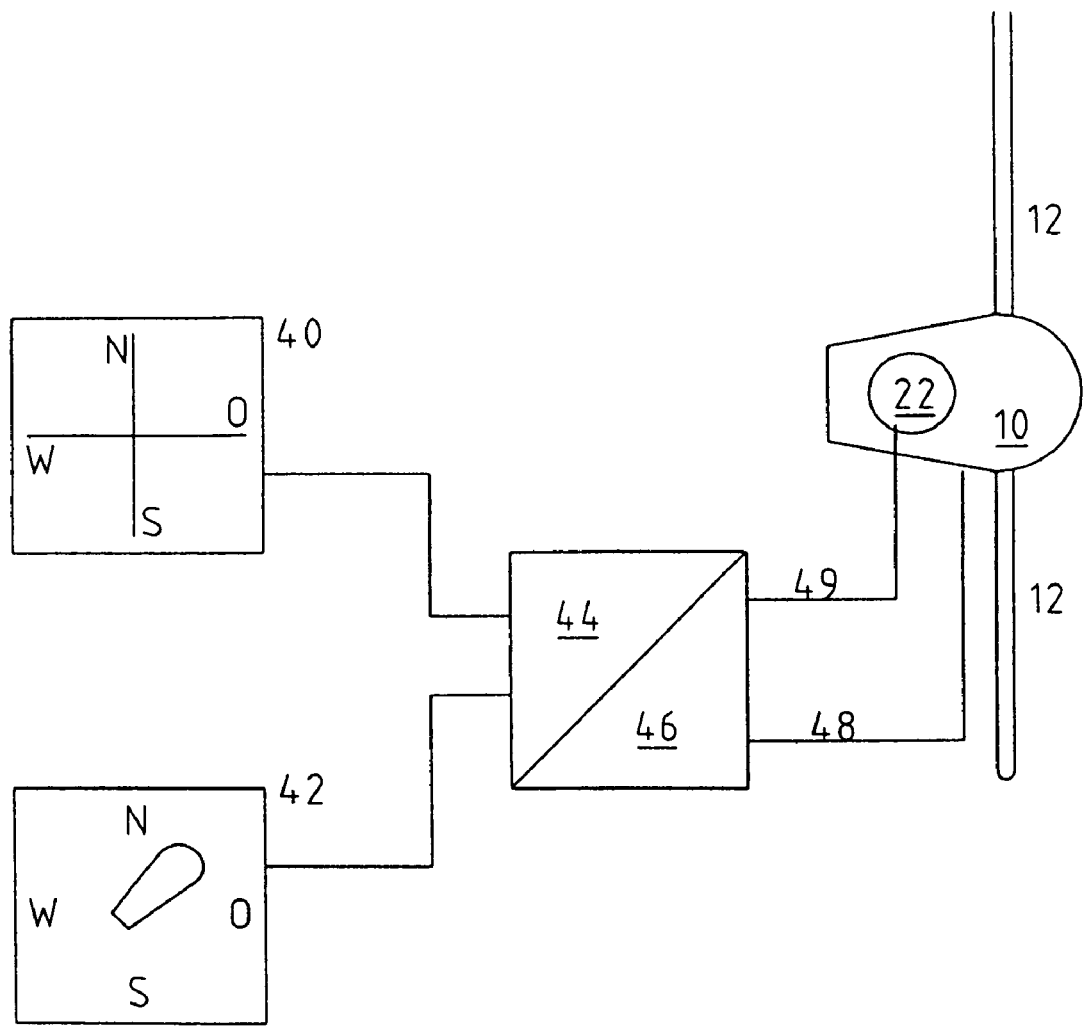
FIG. 3 shows a simplified view of a control according to the invention.

FIG. 3 shows an embodiment for the control of the wind power installation in accordance with the invention. A device 40 ascertains the wind direction. That device 40 can be for example a simple weather vane, for example with an incremental sender, as is provided in any case on any wind power installation. A further device 42 ascertains the azimuthal position. Those two devices 40, 42 communicate their measurement results or data to a control 44 which in turn evaluates the two values from the wind direction detection device 40 and the azimuthal position detection device 42 and compares them and if necessary, on the basis of predeterminable characteristic values, implements suitable adaptation of the angle of incidence of the rotor blades, by way of an adjusting device 46.

In this respect it is possible to predetermine for example three threshold values for the magnitude of the difference between the wind direction and the azimuthal position. If the deviation between the two values reaches the first of those threshold values for a given period of time, the angle of incidence of a rotor blade 12 is adjusted by an adjusting device 46 by way of a control line 48, for example to a pitch motor (not shown), in a given segment of the circle of the rotor, in such a way that the air resistance thereof is reduced so that the machine housing 10 with the rotor is adjusted in tracking relationship with the wind until the wind direction and the azimuthal position are again coincident within also predeterminable tolerance limits. The control 44 then again provides for the setting of the rotor blades 11, 12, which is appropriate for optimum energy output.

If in evaluation of the data the second threshold value in respect of the deviation between azimuthal position and wind direction occurs, the control 44 can switch on the azimuthal drive 22, for example, by way of a separate control line 49 and thus support the wind direction tracking effect. The third threshold value can be so determined that then a wind direction tracking action is no longer possible by virtue of the change in the angle of incidence of a rotor blade so that here the azimuthal drive 22 is definitely required.

Figure 4:
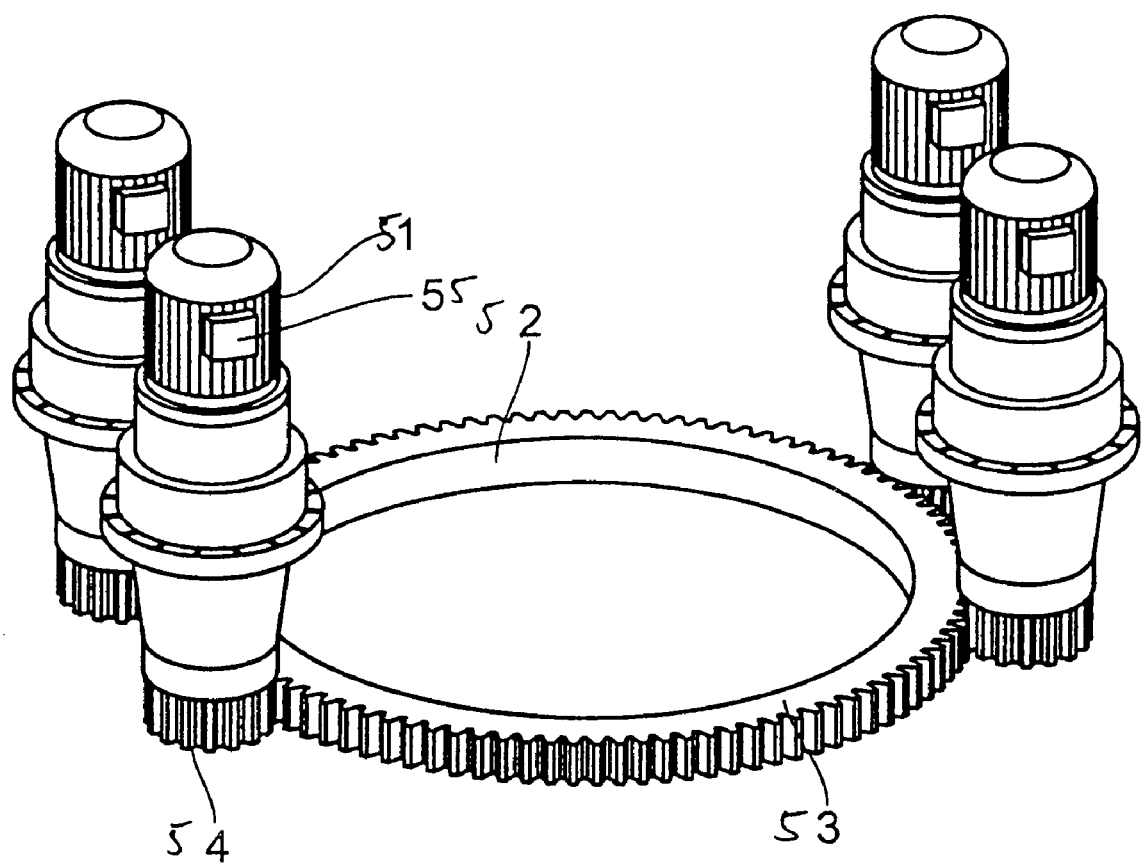
FIG. 4 shows a view on to an azimuthal bearing with four drives.

FIG. 4 shows an active wind direction tracking device by means of a motor azimuthal drive. That motor drive rotates the machine head of the wind power installation in such a way that the rotor of the wind power installation is optimally aligned in the direction of the wind. Such an active drive for the wind direction tracking action can be an azimuthal drive 51 with an associated azimuthal bearing 52. That azimuthal bearing is disposed between the pylon head and the machine housing. One azimuthal drive is sufficient in small wind power installations, larger wind power installations are generally equipped with a plurality of azimuthal drives, for example four azimuthal drives, as shown in FIG. 4. The four drives 51 are distributed uniformly around the periphery of the pylon head (a non-uniform distribution is also possible).

The illustrated azimuthal drives are three-phase current asynchronous motors which are used as asynchronous drive machines. For adjustment purposes, for active azimuthal adjustment, those three-phase current asynchronous motors are supplied with corresponding three-phase current, in which case they produce a corresponding torque. After the machine housing adjustment procedure (after it has assumed the desired azimuthal position) the four three-phase current asynchronous motors (ASM) are switched off and thus no longer produce any torque. In order to uniformly retard the motors and also thereafter still to produce a braking torque, the motors are supplied with a direct current immediately after separation from the three-phase current network, as far as possible immediately thereafter. That direct current produces a stationary magnetic field in the motors which are immediately braked therewith. The direct current supply continues as far as possible throughout the entire stoppage time and can be regulated in respect of amplitude.

Figure 5:
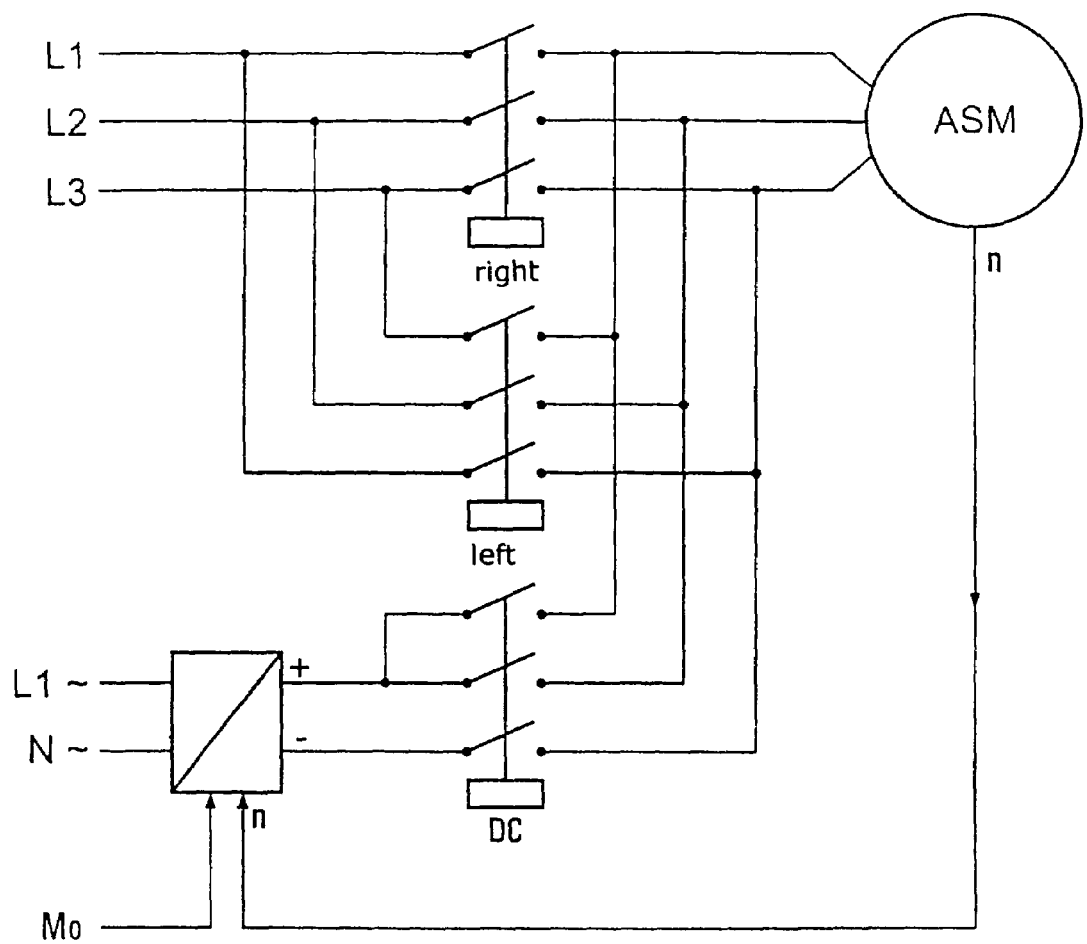
FIG. 5 shows a circuit diagram for an azimuthal motor.

After the adjusting operation the ASM-drives are supplied with a regulated direct current by means of a regulating device (see FIG. 5). Slow rotary movements of the pylon head which are caused by asymmetrical gusts of wind are only damped by a low direct current (about 10% of the minimum current), but are admitted. Faster rotary movements are avoided by an adapted higher direct current and thus a higher braking torque. In the case of very fast rotary movements the direct current is raised to the nominal current of the motor.

The asynchronous motor does not produce any torque with the direct current magnetisation in the stopped condition. However with a rising rotary speed—up to about 6% of the nominal rotary speed—the torque produced rises linearly, symmetrically in both directions of rotation.

It is also appropriate for the individual motors of the azimuthal drives to be coupled by means of a current transformer. Simple counter-coupling of the asynchronous motors stabilises the individual drives in that respect.

If therefore—as described—azimuthal adjustment is not to be effected by means of active supply of three-phase current to the asynchronous motors, the direct current of the asynchronous azimuthal drives is set to zero or is made so low that controlled adjustment of the azimuth can still be effected by means of rotor blade angle adjustment. In order for example to maintain a low braking counter-moment, it may also be advantageous to limit the direct current of the asynchronous motors to a value of between 1% and 10% of the nominal current so that a motor braking moment is also afforded, over and above the braking action of the plain bearings, and that braking moment makes it possible for the azimuthal change to be effected in the desired manner and without excessive swing deflection.

The invention claimed is:

1. A wind power installation comprising:
   a pylon;
   a rotor disposed on the pylon, wherein the rotor includes at least one individually adjustable rotor blade;
   a device to detect a wind direction;
   a device to detect an azimuthal position of the rotor;
   a device to detect a deviation from vertical of the pylon; and
   a control unit, coupled to the rotor blade, to adjust an angle of incidence of the at least one adjustable rotor blade using information which is representative of: (i) the wind direction, (ii) the azimuthal position of the rotor, and (iii) the deviation from vertical of the pylon.

2. The wind power installation of claim 1 further including a platform, adapted to float on or in water, wherein the pylon and rotor are disposed on the platform.

3. The wind power installation of claim 2 further including a device to detect a deviation from horizontal of the platform.

4. The wind power installation of claim 3 wherein the control unit adjusts the angle of incidence of the at least one adjustable rotor blade using information which is representative of the deviation from horizontal of the platform.

5. The wind power installation of claim 1 further including:
   an azimuthal bearing to adjust the azimuthal position of the rotor; and
   a braking device, coupled to the azimuthal bearing, to brake movement of the azimuthal bearing.

6. The wind power installation of claim 1 further including:
   an azimuthal bearing to adjust the azimuthal position of the rotor; and
   an azimuthal drive, coupled to the azimuthal bearing, to adjust the azimuthal position of the rotor, wherein the azimuthal drive includes at least two asynchronous motors which are mechanically coupled to the azimuthal bearing and controlled using a three-phase current.

7. The wind power installation of claim 1 further including:
   an azimuthal bearing to adjust the azimuthal position of the rotor; and
   an azimuthal drive, coupled to the azimuthal bearing, to adjust the azimuthal position of the rotor, wherein the azimuthal drive includes four asynchronous motors which are mechanically coupled to the azimuthal bearing and controlled using a three-phase current.

8. The wind power installation of claim 1 further including a braking device, coupled to an azimuthal bearing, to provide a braking torque to the azimuthal bearing.

9. The wind power installation of claim 8 wherein the braking device includes at least two asynchronous motors that are responsive to a direct current to apply a braking torque to the azimuthal bearing.

10. A wind power installation comprising:
    a pylon;
    a rotor disposed on the pylon;
    a plurality of rotor blades, disposed on the rotor, including at least one adjustable rotor blade;
    a device to detect a wind direction;
    a device to detect an azimuthal position of the rotor;

a device to detect a deviation from vertical of the pylon; and a controller, coupled to the rotor blade, to adjust a position of the at least one adjustable rotor blade relative to the wind direction using information which is representative of (i) the wind direction, (ii) the azimuthal position of the rotor, and (iii) the deviation from vertical of the pylon.

11. The wind power installation of claim 10 further including a platform, adapted to float on or in water, wherein the pylon and rotor are disposed on the platform.

12. The wind power installation of claim 11 further including a device to detect a deviation of the platform out of the horizontal.

13. The wind power installation of claim 12 wherein the controller adjusts the angle of incidence of the at least one adjustable rotor blade using information which is representative of deviation of the platform out of the horizontal.

14. The wind power installation of claim 10 further including:
an azimuthal bearing to adjust the azimuthal position of the rotor; and
a braking device, coupled to the azimuthal bearing, to brake the movement of the azimuthal bearing.

15. The wind power installation of claim 10 further including:
an azimuthal bearing to adjust the azimuthal position of the rotor; and
an azimuthal drive, coupled to the azimuthal bearing, to adjust the azimuthal position of the rotor, wherein the azimuthal drive includes at least two asynchronous motors which are mechanically coupled to the azimuthal bearing and controlled using a three-phase current.

16. The wind power installation of claim 10 further including:
an azimuthal bearing to adjust the azimuthal position of the rotor; and
an azimuthal drive, coupled to the azimuthal bearing, to adjust the azimuthal position of the rotor, wherein the azimuthal drive includes four asynchronous motors which are mechanically coupled to the azimuthal bearing and controlled using a three-phase current.

17. The wind power installation of claim 10 further including a braking device, coupled to an azimuthal bearing, to provide a braking torque to the azimuthal bearing.

18. The wind power installation of claim 17 wherein the braking device includes at least two asynchronous motors that are responsive to a direct current to apply a braking torque to the azimuthal bearing.

19. A method for controlling a wind power installation having a pylon, a rotor disposed on the pylon, and at least one adjustable rotor blade disposed on the rotor, the method comprising:
detecting a wind direction;
detecting an azimuthal position of the rotor;
detecting a deviation from vertical of the pylon; and
controlling an angle of incidence of at least one adjustable rotor blade relative to the wind direction using information which is representative of (i) the wind direction, (ii) the azimuthal position of the rotor, and (iii) the deviation from vertical of the pylon.

20. The method of claim 19 further including adjusting the angle of incidence of the at least one adjustable rotor blade relative to the wind direction when a first threshold value in respect of the magnitude of the change in wind direction and a predetermined duration are exceeded.

21. The method of claim 19 further including adjusting the angle of incidence of the at least one adjustable rotor blade relative to the wind direction using the azimuthal drive when a second threshold value of the magnitude of the change in wind direction is exceeded.

22. The method of claim 19 further including adjusting the angle of incidence of the at least one adjustable rotor blade relative to the wind direction using only the azimuthal drive when a third threshold value of the magnitude of the change in wind direction is exceeded.

* * * * *